United States Patent [19]
Alaimo et al.

[11] 3,856,803
[45] Dec. 24, 1974

[54] 2-(SUBSTITUTED AMINO)QUINOLIZINIUM BROMIDES

[75] Inventors: Robert J. Alaimo; Marvin M Goldenburg, both of Norwich, N.Y.

[73] Assignee: Morton-Norwich Products, Inc., Norwich, N.Y.

[22] Filed: Dec. 26, 1973

[21] Appl. No.: 430,945

Related U.S. Application Data

[62] Division of Ser. No. 278,618, Aug. 17, 1972.

[52] U.S. Cl............... 260/296 B, 260/156, 424/263
[51] Int. Cl......................................... C07d 31/42
[58] Field of Search ................................. 260/296 B

[56] References Cited
UNITED STATES PATENTS

| | | | |
|---|---|---|---|
| 3,517,019 | 6/1970 | Alaimo........................ | 260/294.8 C |
| 3,780,048 | 12/1973 | Alaimo et al................. | 260/294.8 B |

Primary Examiner—Alan L. Rotman
Attorney, Agent, or Firm—Anthony J. Franze

[57] ABSTRACT 2-(Substituted amino) quinolizinium bromides are useful antiinflammatory agents.

1 Claim, No Drawings

2-(SUBSTITUTED AMINO)QUINOLIZINIUM BROMIDES

This is a division of application Ser. No. 278,618, filed Aug. 17, 1972.

This invention relates to 2-(substituted amino) quinolizinium bromides and particularly to those of the formula:

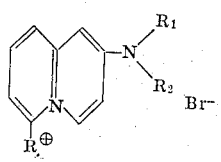

wherein R is hydrogen or methyl; $R_1$ is hydrogen or amino, and $R_2$ is hydroxyethyl, 2,3-dihydroxypropyl, p-phenylazoanilino or m-trifluoromethylanilino.

The compounds of this invention possess marked anti-inflammatory activity. When administered perorally in aqueous suspension at a dose of 300 mg/kg to rats which thereafter receive a subplantar injection of 0.05 ml. of a 1% solution of carrageen (Viscarin $^{(R)}$) in the hindfoot, edema of the foot is greatly reduced. They are thus useful agents in combatting swelling and edema in animal tissue.

The method which is currently preferred for the preparation of the compounds of this invention consists in bringing together 2-bromo-6-methylquinolizinium bromide or 2-bromoquinolizinium bromide and the appropriate amine in a suitable solvent such as ethanol or isopropanol preferably under the influence of heat.

In order that this invention may be understood by and readily available to those skilled in the art the following illustrative examples are supplied.

EXAMPLE I

2-[1-[(2-Hydroxyethyl)hydrazino]-6-methyl]quinolizinium Bromide

To a solution of 2-bromo-6-methylquinolizinium bromide (40.0 g, 0.13 mole) in ethanol (500 ml.) was added 2-hydroxyethylhydrazine (30.0 g, 0.4 mole). The stirred mixture was boiled under reflux for 5 hours. Cooling of the mixture in an ice bath precipitated a yellow solid, which was removed by filtration and washed with ether. The product (36.0 g, 92%) was recrystallized from ethanol to provide gold colored needles which melted at 209°–210°.

Anal.

Calcd. for $C_{12}H_{16}BrN_3O$: C, 48.33; H, 5.41; Br, 26.80.
Found: C, 48.48; H, 5.28; Br, 26.81; 26.93.

EXAMPLE II 2-(2,3-Dihydroxypropylamino)quinolizinium Bromide

To a solution of 2-bromoquinolizinium bromide (8.0 g, 0.03 mole) in ethanol (150 ml.) was added 1-amino-2,3-propanediol (4.0 g, 0.04 mole). The stirred mixture was boiled under reflux for 3 hours. Cooling of the reaction mixture in an ice bath along with vigorous scratching precipitated a dark redbrown solid. The product (5.0 g, 60%) was recrystallized from ethanol to provide salmon colored crystals which melted at 166°–168°.

Anal.

Calcd. for $C_{12}H_{15}BrN_2O_2$: C, 48.17; H, 5.05; Br, 26.71.
Found: C, 48.42; H, 5.01; Br, 26.58; 26.64.

EXAMPLE III 2-(p-Phenylazoanilino)quinolizinium Bromide

To a solution of 2-bromoquinolizinium bromide (15.0 g, 0.05 mole) in isopropanol (300 ml.) was added p-phenylazoaniline (18.0 g, 0.09 mole). The stirred mixture was boiled under reflux for 4.0 hours. The reaction mixture was chilled in an ice bath and the solid was removed by filtration, providing 10.0 g. of maroon powder. The supernatant solution provided 2.0 g. additional reddish powder, making the total yield 19.0 g. (90%). Recrystallization from isopropanol/ethanol and again from ethanol/ether provided a rust-colored powder melting at 239°–240°.

Anal.

Calcd. for $C_{21}H_{17}BrN_4$: C, 62.23; H, 4.23; N, 13.95; Br, 19.72.
Found: C, 61.94, 62.07; H, 4.23, 4.29; N, 13.65, 13.67; Br, 19.80, 19.67.

EXAMPLE IV 2-(m-Trifluoromethylanilino)quinolizinium Bromide

To a solution of 2-bromoquinolizinium bromide (45 g, 0.15 mole) in ethanol (600 ml.) was added m-trifluoromethylaniline (50 g, 0.30 mole). The stirred mixture was boiled under reflux for 5 hours, then treated with Darco and filtered. The product was precipitated with ether. The crude product weighed 42 g. (76%). Recrystallization from isopropanol/ether provided material that melted at 229°–230°.

Anal.

Calcd. for $C_{16}H_{12}BrF_3N_2$: C, 52.05; H, 3.28; N, 7.59.
Found: C, 51.96; H, 3.25; N, 7.61.

What is claimed is:

1. The compound 2-[1-(2-hydroxyethyl)hydrazino]-6-methyl quinolizinium bromide.

* * * * *